Oct. 27, 1942.  J. W. KINNUCAN  2,300,293
SHAFTING
Filed March 20, 1940
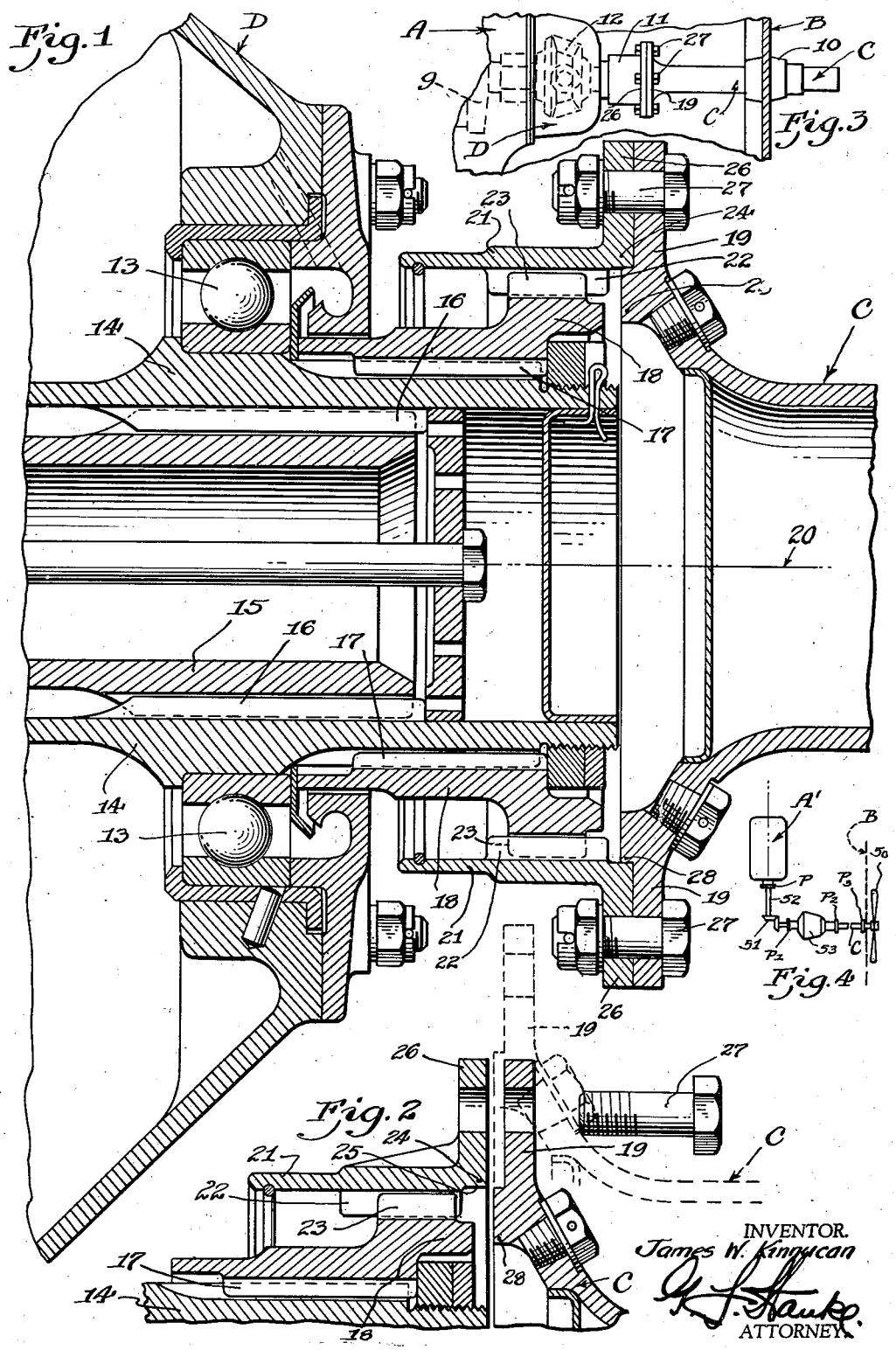
INVENTOR.
James W. Kinnucan
ATTORNEY Patented Oct. 27, 1942

2,300,293

UNITED STATES PATENT OFFICE 2,300,293

SHAFTING

James W. Kinnucan, Detroit, Mich., assignor, by mesne assignments, to Continental Aviation and Engineering Corporation, a corporation of Virginia Application March 20, 1940, Serial No. 324,991

2 Claims. (Cl. 287—130)

My invention relates to shafting and more particularly to means for connecting a propeller shaft with an engine driving shaft in an aircraft power plant.

In an aircraft power plant the propeller shaft is often located at a point removed from the engine, and is driven thereby by suitable shafting connected preferably in such a way as to locate the shafting coaxially with respect to each other. It is preferred, in many instances, to include a reduction gear drive between the engine and the propeller shaft thus, it is found to be convenient to provide a driving connection such as illustrated in the accompanying drawing between the engine and driving element of the reduction drive as well as between the driven element of the reduction drive and the propeller shaft. Obviously, though, I may find many places in an aircraft power plant where my present invention may be embodied, it will be observed that I have chosen for purpose of illustration to show my shaft driving connection embodied in a propeller shaft drive lying intermediate the engine gear reduction assembly and a propeller shaft extension.

In an installation such as broadly illustrated herein, it is customary to support the propeller shaft or other driven shaft with a fixed support, that holds same from axial movement relative to the support and the driving shaft to which it is connected. These supports are conveniently constructed to permit any lateral adjustment of the driven shaft, the propeller shaft or propeller shaft extension.

An object of my present invention is to facilitate the assembly and driving connection of an aircraft propeller shaft with an engine by providing a shaft connection constructed and arranged to be readily assembled together to effect the driving connection aforesaid.

A further object of my present invention is to provide an improved driving connection between driving and driven shafts by incorporating in the driving connection assembly an intermediate element drivingly connected with one of said members and adjustable longitudinally thereof to facilitate the engagement and driving connection with said other member.

A still further object of my present invention is to provide an improved structure for the purposes above specified by incorporating in the assembly an intermediate adjustable driving element, having means carried thereby for locating the driven element in coaxial alignment with the driving element, but which is retractable from engagement with the driven element on being disengaged therefrom to release said driven element locating means whereby to facilitate the disassembly of the driving and driven elements, without relative axial movement of said elements.

For more detailed understanding of my invention, reference may be had to the accompanying drawing illustrating a practical application of the invention to an engine and showing a preferred embodiment thereof, in which like characters refer to like parts throughout the several views, and in which:

Fig. 1 is a fragmentary longitudinal sectional view showing my improved driving connection constructed for connecting a propeller shaft with an engine driven shaft or member, Fig. 2 is a fragmentary sectional view illustrating how the driven shaft is disconnected from engagement with the driving shaft, Fig. 3 is a diagrammatic plan view of my device showing same in assembly with the engine and a fixed propeller shaft support, and Fig. 4 is a diagrammatic plan view of an aircraft power plant installation illustrating various driving connections and the application thereto of the present invention.

As stated above, I have chosen to illustrate my present invention in connection with an engine A which is supported within an aircraft structure B and drivingly connected with a propeller shaft C supported by a fixed support 10. The propeller shaft aforesaid is preferably connected with a driving element 11 which is in turn drivingly connected with the crankshaft 9 of the engine A. Preferably the engine A has secured thereto a reduction gear case D which supports internally thereof a suitable reduction gear mechanism 12.

Therefore, the driving shaft assembly may, in general, be called a driving element and may be an extension of the engine crankshaft, which may or may not include intermediate mechanism, such as the gear reduction 12. In Figs. 1 and 3 I have illustrated in detail a power plant structure and have preferably shown the gear case D as carrying bearings 13 for supporting a shaft 14. The shaft 14 is splined or otherwise drivingly connected to the driving shaft 15 by the splines 16. In the present construction, the shaft 14 is splined as at 17 to a driving member or sleeve 18. In the claims where I have referred to a driving shaft or member it will be plainly understood that the invention is not particularly limited to he exact structure illustrated in Fig. 2, as the driving shaft may comprise a crankshaft extension connected to the crankshaft in any conventional manner. We therefore can identify the sleeve 18 as a driving shaft. The propeller shaft C is provided with a flanged portion 19 and it will be noted that same is supported in axial alignment with the axis 20 of the driving shaft.

I have provided a simplified driving connection between the propeller shaft or propeller shaft extension C and driving shaft 18 which consists of an intermediate driving sleeve 21. This sleeve 21 is provided with internal splines 22 engaging with the external splines 23 carried by the driving shaft 18, and it may be noted that this sleeve 21 is adjustable longitudinally with respect to the driving shaft 18. The sleeve 21 is provided with an extension portion 24 having a cylindrical bore 25 projecting beyond the end of the driving shaft 18, and also carries a flange 26 complementary to the flange 19 carried by the propeller shaft. Suitable bolts or other fastening devices 27 secure the flanges 19 and 26 together. The propeller shaft has a cylindrical extension 28 which is constructed and arranged to be piloted within the bore 25 of the sleeve 21 whereby to locate and axially align the propeller shaft with respect to the driving shaft 18.

As described above the support 10 for the propeller shaft or extension C is so arranged as to not permit the relatively longitudinal movement of the propeller shaft with respect to this support. Also the engine is securely mounted to a structure which is fixed relative to the support 10 and therefore the propeller shaft may be adjusted with respect to the driving shaft only in a lateral direction. The propeller shaft is disengaged from the driving shaft by unscrewing the bolts 27 and retracting the sleeve 21 away from engagement with the flange 19 of the propeller shaft as is clearly illustrated in Fig. 2. When this sleeve 21 is retracted it will be noted that the propeller shaft extension 28 is released from engagement with the bore 25 carried by the driving shaft 21 and thus the propeller shaft may be shifted laterally as indicated by the dotted line showing in Fig. 2.

Obviously the driving connection herein illustrated has application to other parts of the power plant structure in addition to the application illustrated in Fig. 1. In Fig. 4 I have illustrated diagrammatically other applications of this same type of driving connection. In this figure the engine A' drives shaft 52 which is drivingly connected to actuate the propeller 50 through the intermediate elements such as the beveled reduction gear assembly 51, reduction gear mechanism 53 and shaft C. In this figure, it will be noted that I have provided driving connections P, P1, P2, and P3. All of these driving connections are constructed substantially like that illustrated in Fig. 1 and embody a sleeve splined to the driving element and adjustable longitudinally thereof for piloting engagement with the driven element. It is noted therefore that although I have illustrated in detail only one application of the shaft driving connection, the same construction may be incorporated elsewhere in the power plant assembly for connecting axially aligned shaft members in which the driven shaft is adjustable only laterally with respect to the driving shaft.

In these constructions it is undesirable, if not actually impractical, to provide a propeller shaft support which permits the longitudinal adjustment of the propeller shaft relative to the support and driving element. The present construction provides a mechanism which can be economically manufactured and it can be very readily assembled together with a minimum of time and labor. The splined connection between the driving shaft and intermediate driving shaft provides for ready longitudinal adjustment of this sleeve and the convenient securing of said sleeve and propeller shaft, and at all times maintains the propeller shaft in axial alignment with the driving shaft.

Although I have described and illustrated a preferred embodiment of my invention, it will be apparent to those skilled in the art to which my invention pertains that various modifications and changes may be made therein without departing from the spirit of my invention or from the scope of the appended claims.

I claim:

1. In a power transmission for aircraft propulsion systems and the like, having a pair of shafts positioned in axial alinement with their adjoining ends closely adjacent and so mounted as to normally preclude longitudinal movement of either, whereby they may be disassembled and reassembled only through transverse movement of one relative to the other, a power transmitting coupling for detachably connecting said adjoining shaft ends, comprising a torque-transmitting member carried by the end portion of one of said shafts and having an end face axially spaced from the end face of the shaft by which it is carried; and a sleeve surrounding said shaft end portion and torque-transmitting member and detachably secured to the adjoining end portion of the other shaft, said sleeve having companion torque-transmitting means longitudinally slidably engageable with the first mentioned member, whereby upon disengagement of the sleeve from the shaft end to which it is secured it may be slid longitudinally upon the torque-transmitting member so that the end face thereof is substantially aligned with the end face of the aforesaid torque-transmitting member to provide for said transverse movement of one of the shafts relative to the other for disassembly and reassembly.

2. In a power transmission for aircraft propulsion systems and the like, having a pair of shafts positioned in axial alinement with their adjoining ends closely adjacent and so mounted as to normally preclude longitudinal movement of either, whereby they may be disassembled and reassembled only through transverse movement of one relative to the other, one of said shafts having longitudinally extending torque-transmitting teeth, a power transmitting coupling for detachably connecting said adjoining shaft ends, comprising a torque-transmitting member having longitudinally extending internal torque-transmitting teeth drivingly connected with the longitudinally extending torque-transmitting teeth carried by one of said shafts; said member also having external longitudinally extending torque-transmitting teeth, and a sleeve encircling said member and shaft end portion and detachably secured to the adjoining end portion of the other shaft, said sleeve having complementary teeth longitudinally slidably engageable with the external teeth of said member to transmit torque between the shafts while preventing any substantial axial misalinement thereof, the end face of said member axially spaced inwardly of the end face of the first shaft, said sleeve, upon disconnection from the shaft to which it is detachably secured, being longitudinally slidable upon the said member and capable of being positioned in driving relation with said member and to align the end face of the sleeve with the end face of the member to provide for said transverse movement of one of the shafts relative to the other for disassembly and reassembly.

JAMES W. KINNUCAN.